US005982597A

United States Patent [19]

Webb

[11] Patent Number: 5,982,597
[45] Date of Patent: Nov. 9, 1999

[54] SHORTING FUSABLE METAL OXIDE VARISTOR

[76] Inventor: Rommie Fred Webb, 28 Wheeler, Irvine, Calif. 92620

[21] Appl. No.: 09/036,471

[22] Filed: Mar. 6, 1998

Related U.S. Application Data

[60] Provisional application No. 60/039,955, Mar. 6, 1997.

[51] Int. Cl.[6] ........ H02H 5/04

[52] U.S. Cl. ........ 361/103; 361/104; 361/124

[58] Field of Search ........ 361/103, 104, 361/111, 117–119, 124

[56] References Cited

U.S. PATENT DOCUMENTS 5,708,553 1/1998 Hung ........ 361/103
5,781,394 7/1998 Lorenz et al. ........ 361/124

*Primary Examiner*—Michael J. Sherry
*Attorney, Agent, or Firm*—Marvin E. Jacobs

[57] ABSTRACT

A fuse assembly comprising a fuse element and a fuse cavity are formed integrally with the body of a Metal Oxide Varistor (MOV). Melting of the fuse element forms fused material which flows into the fuse cavity. The molten material electrically joins the metalization films on each side of the MOV which causes the MOV to fail shorted before the MOV can overheat and fracture from over voltage caused by excessive transient voltages. The fuse element has the current carrying capability to allow a resultant current to flow which will cause the primary circuit protection device (fuse or circuit breaker) to open. This provides protection against a violent fracture of the MOV and a MOV that can no longer function because it has opened and is undetected.

14 Claims, 1 Drawing Sheet

SHORTING FUSABLE METAL OXIDE VARISTOR

CROSS-REFERENCE TO RELATED APPLICATION

This application claims the benefit of U.S. provisional application Ser. No. 60/039,955 filed Mar. 6, 1997

TECHNICAL FIELD

This invention relates to a fusible, fail short Metal Oxide Varistor (MOV) as a transient voltage protection device and, more particularly, this invention relates to a Metal Oxide Varistor having a predictable failure method.

BACKGROUND OF THE INVENTION

Metal Oxide Varistors (MOV) are semiconductor devices that are fabricated using technology from the ceramic capacitor industry. MOV's that are presently produced can fracture violently when abused by pulse currents that exceed the rating of the device. MOV's are fabricated by milling alumina ceramic into a granular powder which can be coated by a metal oxide. This powder which is composed of grains of ceramic is coated by metal oxide. Then, the coated powder is pressed into a disc shape and sintered. At that point metalization is applied to each of the two sides, leads are attached and a protective epoxy coating is applied. An outer guard zone may be provided on the disc. Over current protection of the MOV and electronic circuit is accomplished by external fusing to the MOV. There is however, no integral thermal protection for the MOV so as to prevent and or reduce the occurrence of violent fracture.

MOV products are used to provide transient voltage protection for electronic equipment. MOV's are used in across-the-power-line applications and internal to an electronic circuit. The purpose of MOVs is to provide greater reliability in field applications where transient voltages in excess of normal high line voltages are present. These transient voltages can be generated by electric power utilities shifting loads, lightning strikes or induced lightning, and turning on and off of heavy equipment in industrial environments. Transient voltages can also be produced by the charging and discharging of inductors and large capacitors in electronic equipment.

MOV's utilization in across-the-power-line applications are at risk to transient voltage spikes that can exceed the capability of the MOV to absorb energy. This causes rapid heating in the MOV which will eventually lead to thermomechanical stress of the varistor and also has the potential for thermal damage to surrounding devices. Further, there is the potential for out gassing of materials which can cause the MOV to fracture violently into several sections. Usually, the violent fracture is caused by thermal expansion. These fractures usually will also dislodge part of the protective epoxy coating surrounding the MOV. An MOV that fractures due to overheating as a result of a voltage spike will become an open circuit. Current flow will be still available to the application and personnel operating the application will be unaware that the MOV has failed thus creating a potentially dangerous situation for personnel who may come in direct contact with the circuit and unaware of the MOV failure.

STATEMENT OF THE INVENTION

This invention will cause the MOV to fail shorted. As a result, the primary over current device, fuse or circuit breaker, in an electronic circuit will trip from the overcurrent thus opening the current flow to the application. As the MOV short circuits, the heat build-up across the MOV begins to dissipate, thereby alleviating the thermal expansion stresses which would cause the MOV to fracture violently. The invention consists of providing a fusing assembly formed directly into the body of a MOV. A fusing cavity is formed through the body of a MOV and a temperature sensitive fusing element is deposited on the electrode film on each side of the MOV at each opening of the cavity. The fusing elements are designed to melt at a specific temperature threshold. If the MOV encounters an abnormally high voltage spike, the temperature in and across the MOV will increase. If the temperature threshold for the fusing elements is attained, said fusing elements will melt and fill said fusing cavity forming a continuous conductive path from one side of the MOV to the other side, thus producing a direct short in the MOV from one element to another. Any excessive voltage and resultant current that occurs because of the short circuit will pass through the MOV without causing additional heating. When this occurs, the primary end equipment, over current protection device, fuse or circuit breaker, will open thus removing power from the entire application or system. If the MOV is present in an across-the-line application, the MOV would have to be replaced and a damage assessment of the circuit would be appropriate. The size of the fusing cavity and the type of the fusing element are dependent on how much current the fused short would be expected to handle and upon the ability of the fusing material to overcome the surface tension of the MOV or ceramic material in and near said fusing cavity.

The fusing element need not be in direct contact with either of the metalization layers initially so long as electrical contact can be achieved as the fusing element melts and fills the fusing cavity. Preferably, a fusing element is initially in electrical contact with a respective metalization layer on either side of the MOV.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
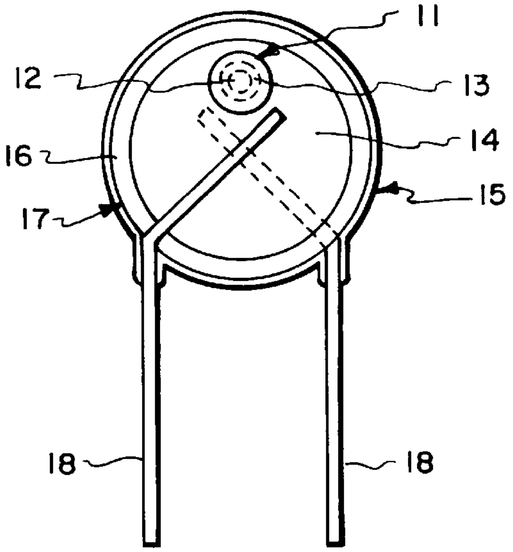
FIG. 1 is a side view of the novel MOV illustrating the key elements and placement of the fusing cavity with respect to other elements in the MOV.
Figure 2:
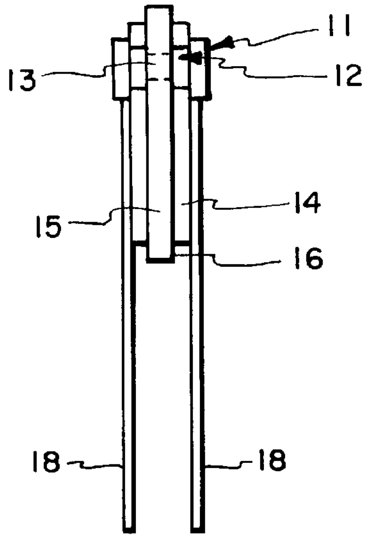
FIG. 2 is an end view in elevation of the novel MOV showing the said fusing cavity relative to the MOV body and the position of said fuse element relative to the said fusing cavity.
Figure 3:
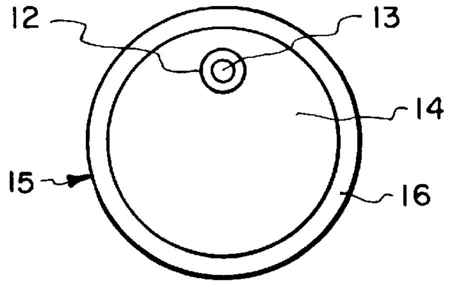
FIG. 3 is a side view of the MOV disc illustrating the configuration of the MOV without the fuse metal element in position.
Figure 4:
FIG. 4 is a view of the MOV fuse element which is placed over the fuse cavity on both sides of the MOV disc.

Referring now to FIGS. 1 to 4, the position of the key structures of the novel MOV are illustrated. The MOV disc 15 has a fusing cavity or tunnel 13 which is open to both sides of disc 15. Disc 15 is substantially circular in design. A layer of conductive metal 14 is disposed upon either side of disc 15. Each metal layer 14 has preferably a smaller diameter than disc 15 and further has an aperture having a common axis of symmetry with tunnel 13. The area about the circumference of disc 15 which is not covered by metal layers 14 defines a first guard zone 16. Guard zone 12 is formed by the aperture in each metal layer 14 being greater than the aperture at the entrance to fusing cavity 13 on either side of disc 15. FIG. 3 illustrates the configuration of the invention to this point. A pair of wire leads 18 are then connected to a respective metal layer 14 as shown in FIG. 1. Disposed upon the outward facing side of each guard zone 12 is a fuse metal element 11. Fuse element 11 is a solid mass of conductor fusible at a predetermined temperature. This predetermined temperature is below the temperature at which the MOV will fail, fracture or rupture. Fuse element 11 is made from a conductive material such as a solder preform. The two preforms preferably have a combined mass exceeding the volume of cavity 13. Suitably, the preforms have a diameter of approximately two times the diameter of the fuse cavity 13. In one embodiment, the thickness of fuse element 11 is approximately 1 mm and the melting point is approximately 180° C. Preferably, guard zone 12 is formed around the fuse cavity to avoid voltage creep (electron flow) from one electrode or metal layer 14 to another. Also, guard zone 12 avoids processing problems of inducing metalization into the fuse cavity. As the MOV is subjected to excessively high voltages and is required to absorb energy in excess of its normal condition, the MOV will heat. Once the MOV reaches a threshold temperature, fuse element 11 will melt and the molten metal will flow to an area with less mechanical resistance which is fuse cavity 13. As fuse element 11 flows into the fuse cavity, it encounters surface tension resistance from guard zone 12 and the inside surface area of fuse cavity 13. The surface tension is overcome by the excess volume of said fusable material 11 that is present on both sides of MOV disc 15. The fusing elements 11 are placed so as to avoid contact with the wire leads 18 thereby preventing molten fuse element 11 from flowing to a surface with less surface tension than guard zone 12 and fusing cavity 13. An overcoat of epoxy based insulation 17 is applied over the exterior of the entire fuse MOV assembly shown in FIG. 1. This outer coating 17 also acts as a mechanical barrier retaining the molten fuse element 11 within the fuse MOV assembly.

Fuse element 11 will begin to melt above a specified temperature threshold and flow into cavity 13. Once a sufficient amount of molten fuse element 11 is within cavity 13, it will become a conductor of all voltage flow across MOV 15 thereby preventing the temperature across MOV 15 from reaching a critical level which could cause a violent fracture of MOV 15. Fuse cavity 13 will substantially fill with the now molten fuse element 11 causing a direct short circuit from one side metal layer 14 (electrode) to another side metal layer 14(electrode) of the MOV. Electrical current will flow from one wire lead 18 through respective metalization layer 14 and afterwards through cavity 13 which is filled with fuse element 11 that has melted and thereafter to metal layer 14 on the opposite side of MOV disc 15 and thereafter to the respective wire lead 18. The electrical current that flows through cavity 13, metal layers 14 and wire leads 18 of the MOV will cause the primary circuit protection element such as a fuse or circuit breaker, to open. Epoxy coating 17 which surrounds the novel device, should have a higher melting temperature than the epoxy coating utilized on standard MOV's . Epoxy coating 17 should melt at a higher temperature than the solder preform 11 in order to direct the flow of melted solder preform 11 into cavity 13.

Figure 5:
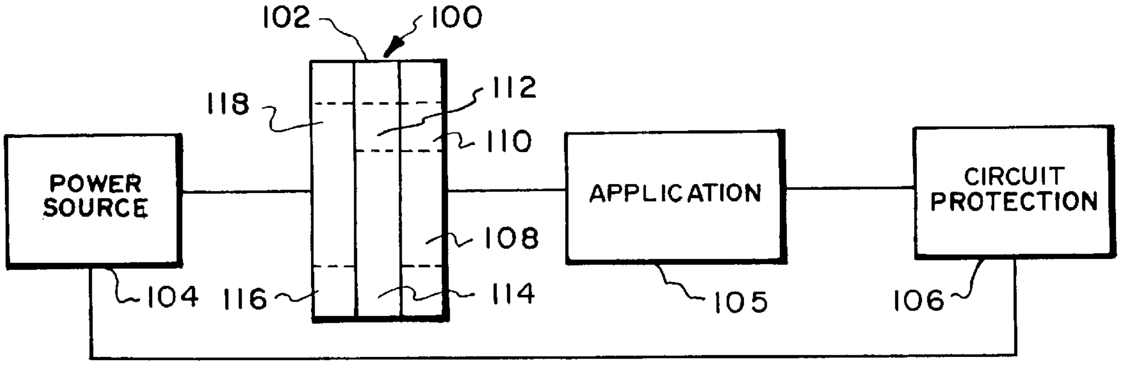
FIG. 5 is a schematic of a system containing the shorting MOV of the invention.

Referring now to FIG. 5, the MOV 100 according to the invention is placed in a circuit 102 containing a power source 104, an application 105 which is powered and a primary circuit protection element 106 such as a fuse or circuit breaker. When the MOV 100 is subjected to excessively high voltages and absorbs excess energy, the MOV 100 will heat. When the melting temperature of preforms 108, 110 of solder on each side of the cavity 112 in the disc 114 is reached, the solder will flow through the cavity 112 and will place metalization layers 116, 118 in contact to short the MOV 100. The circuit is now shorted and the primary circuit protection device 106 will open and break the circuit.

It is to be realized that only preferred embodiments of the invention have been described and that numerous substitutions, modifications and alterations are permissible without departing from the spirit and scope of the invention as defined in the following claims.

I claim:

1. An improved varistor having a center layer comprising a semi-conductive material having a predetermined thickness and diameter and further having a layer of conductive material disposed on opposite sides of the center layer, each conductive layer having a smaller diameter than the center layer and connected to a respective external wire lead, the improvement comprising:

an aperture in each of said layers, each said aperture having a common axis of symmetry thereby forming a tunnel having an interior volume; and a conductive fuse having a first solid mass, said first solid mass contacting at least one of said conductive layers and positioned near said conductive layer respective aperture, said fuse having a melting point below the melting point of said layers such that when a threshold temperature is attained, said fuse will melt and flow into said tunnel substantially filling said tunnel volume to electrically connect said conductive layers to each other thereby creating an electrical short.

2. The improved varistor of claim 1 further comprising a second solid mass such that said solid masses respectively positioned near each of said apertures.

3. The improved varistor of claim 1 wherein each aperture for said conductive layers has a larger diameter than said center layer aperture.

4. The improved varistor of claim 3 further comprising a second solid mass such that said solid masse are respectively positioned near each of said apertures.

5. A varistor comprising:

a center layer comprised of a semi-conductive material having a first and a second side;

a first conductive layer disposed upon said first side of said center layer; said first conductive layer capable of being electrically connected to an external wire lead;

a second conductive layer disposed upon said second side of said center layer; said second conductive layer capable of being electrically connected to an external wire lead;

an aperture in each of said layers, each said aperture having a common axis of symmetry whereby said apertures in said layers forming a tunnel having an interior volume; and a fuse comprising at least one mass of a solid conductive metal, said at least one mass being in electrical contact with at least one of said conductive layers and positioned near at least one of said conductive layer apertures, said at least one mass having a melting point below the melting point of said layers such that when a threshold temperature is attained, said at least one mass will melt and flow into said tunnel, substantially filling said tunnel volume to electrically connect said conductive layers to each other thereby creating an electrical short.

6. The varistor as recited in claim 5 wherein said varistor is encapsulated within an external protective coating.

7. The varistor as recited in claim 5 wherein said aperture for each of said conductive material layers has a larger diameter than said center layer aperture.

8. The varistor as recited in claim 7 wherein said varistor is encapsulated within an external protective coating.

9. A varistor comprising:

a center layer comprised of a semi-conductive material having a first side and a second side;

a first conductive layer disposed upon said first side of said center layer; said first conductive layer capable of being electrically connected to a first external wire lead;

a second conductive layer disposed upon said second side of said center layer; said first conductive layer capable of being electrically connected to a second external wire lead;

an aperture in each of said layers, said apertures having a common axis of symmetry whereby said apertures in said layers forming a tunnel having an interior volume; and a fuse comprising a first and second disc of solid conductive metal, said first disc in electrical contact with said first conductive layer and positioned near said first conductive layer aperture, said second disc in electrical contact with said second conductive layer and positioned near said second conductive layer aperture, each of said discs having a melting point below the melting point of said layers such that when a threshold temperature is attained, said disc will melt and flow into said tunnel, substantially filling said tunnel volume to electrically connect said conductive layers to each other thereby creating an electrical short.

10. The varistor as recited in claim 9 further comprising an external protective coating.

11. The varistor as recited in claim 9 wherein said aperture for each of said conductive material layers has a larger diameter than said center layer aperture.

12. The varistor as recited in claim 11 further comprising an external protective coating.

13. An improved varistor having a center layer made of a semi-conductive material having a predetermined thickness and diameter and further having a layer of conductive material disposed on opposite sides of the center layer, each conductive layer having a smaller diameter than the center layer and connected to a respective external wire lead, the improvement comprising:

an aperture in each of said layers, each said aperture having a common axis of symmetry thereby forming a tunnel having an interior volume;

a conductive fuse comprising a solid mass of conductive material positioned near each aperture in each conductive layer, each of said solid mass having a melting point below the melting points of said layers such that when a threshold temperature is attained, said solid mass will melt and flow into said tunnel substantially filling said tunnel volume and contact said conductive material layers to electrically connect said conductive layers to each other thereby creating an electrical short; and said layers and conductive fuse encapsulated within an external protective coating.

14. The improved varistor of claim 13 wherein said aperture for each of said conductive layers has a larger diameter than said center layer aperture.

* * * * *